M. M. TITTERINGTON.
AIR DISTANCE INDICATOR FOR AIRCRAFT.
APPLICATION FILED SEPT. 14, 1918.
1,368,000.
Patented Feb. 8, 1921.
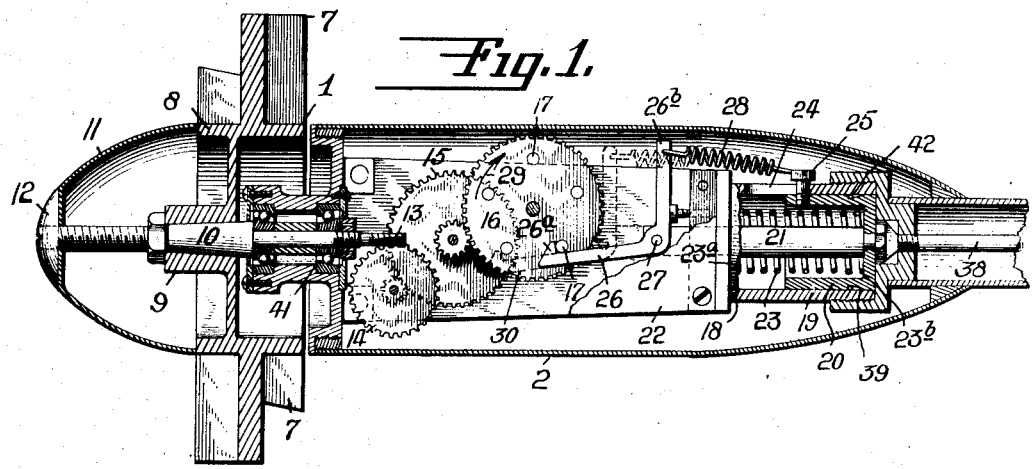
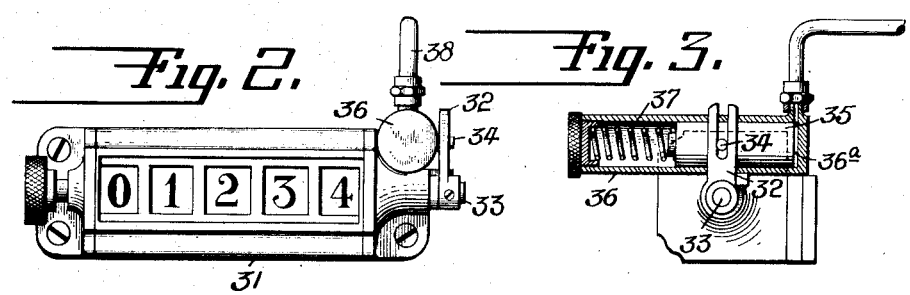
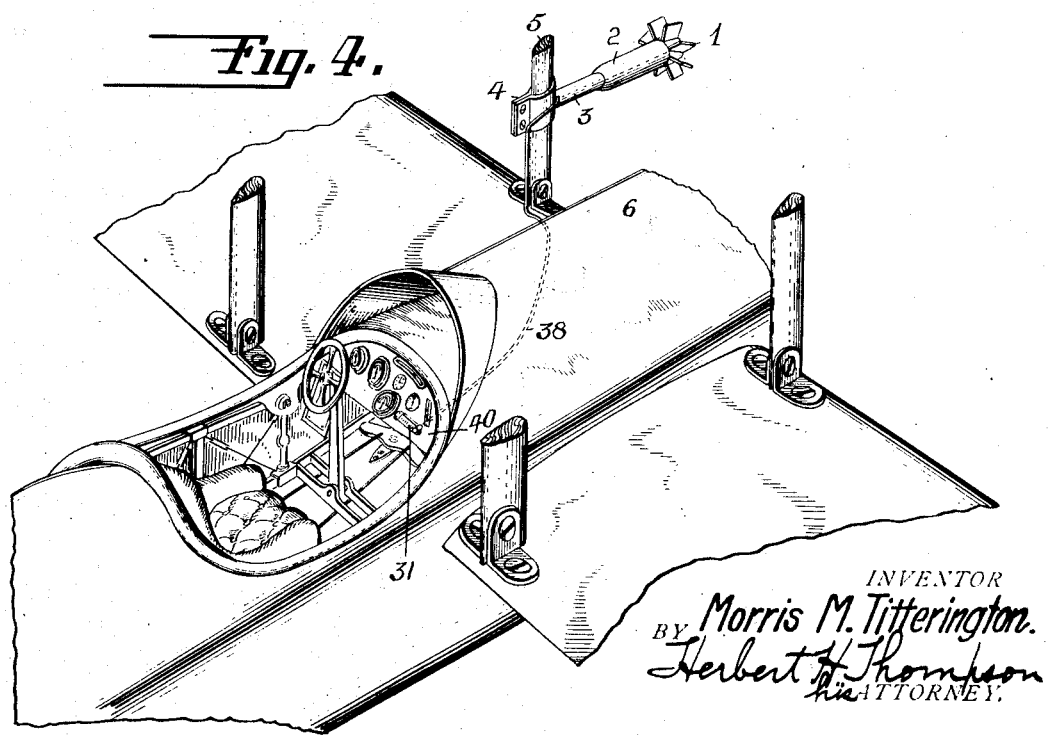
INVENTOR
BY *Morris M. Titterington.*
*Herbert H. Thompson*
*his* ATTORNEY.

UNITED STATES PATENT OFFICE.

MORRIS M. TITTERINGTON, OF BROOKLYN, NEW YORK, ASSIGNOR TO THE SPERRY GYROSCOPE COMPANY, OF BROOKLYN, NEW YORK, A CORPORATION OF NEW YORK.

AIR-DISTANCE INDICATOR FOR AIRCRAFT.

1,368,000.  Specification of Letters Patent.  Patented Feb. 8, 1921.

Application filed September 14, 1918. Serial No. 254,097.

*To all whom it may concern:*

Be it known that I, MORRIS M. TITTERINGTON, a citizen of the United States of America, residing at Brooklyn, in the county of Kings and State of New York, have invented certain new and useful Improvements in Air-Distance Indicators for Aircraft, of which the following is a specification.

This invention relates to distance of flight indicating instruments for aircraft, and especially to indicators actuated by wind pressure caused by the passage of the craft through the air, and adapted to record the relative distance traveled by the aircraft through the air.

The term "air distance" is used throughout the specification and claims herein as an apt expression for the relative movement of the aircraft and the air through which the aircraft is traveling.

The principal object of the invention is to provide an instrument in which the wind actuated member may be placed in an advantageous position upon the craft while the reading or indicating member is located in a position convenient to the pilot.

Other objects will appear in the description which follows.

Referring to the drawings wherein I have shown what I now consider to be the preferred form of my invention:

Figure 1 is a sectional side elevation of the wind actuated portion of the instrument, including the controlling mechanism for the indicating member.

Fig. 2 is a view of the indicating member.

Fig. 3 is a sectional view of the means for actuating the indicating member.

Fig. 4 is a fragmentary view of an aeroplane showing the manner in which my invention may be applied.

In Fig. 4 the wind actuated or responsive member is shown as comprising a wind wheel 1 mounted on the front end of a casing 2 which is attached by means of a tube 3 and clamping means 4 to one of the forward struts 5 of the flying craft 6, while the indicator 31 is shown as mounted on the instrument board 40, with a tubing or other means 38 connecting the two members.

In Fig. 1 the wind wheel 1 is shown as comprising fan blades 7 radially attached to the rim 8 of a wheel having a hub 9. The said hub is shown as mounted upon a shaft 10 protruding through bearings 41, in the front end of casing 2, which is preferably cigar-shaped, *i. e.*, of stream line design.

A stream line cap 11 is shown as covering the front end of the wind wheel, and may be held in place by a nut 12 screwed upon the end of shaft 10; the said shaft preferably being made long enough at its outer end for this purpose.

The inner end of shaft 10 may be provided with worm threads 13 meshing with a worm wheel 14, which forms one member of a chain of reduction gears 15 mounted in a frame or the like 22. The last gear 16 of said train may be provided with a plurality of pegs 17 in one side thereof. As stated, it is of course preferable to mount the wind wheel on some portion of the aircraft where the wind has a free sweep and at a sufficient distance from the propeller not to be influenced thereby. In such position, of course, readings of the instrument cannot be seen by the aviator. It is therefore desirable to transmit readings of the instrument to the dashboard. For this purpose it is obvious that the ordinary transmitting means, such as used in cyclometers for wheeled vehicles, in which a pin on a wheel strikes a starwheel or the like each revolution, would be inoperative as any mechanism which places sudden and intermittent loads on the fan would affect the accuracy of the same or cause the same to stick.

By my invention, however, I have provided a novel fluid pressure transmitting means in which the minimum load is placed upon the wheel, said load being, in addition, substantially uniform although variable pressure impulses are sent out by the transmitter to the indicator on the dash.

The rear end of casing 2 is shown as containing an air compressor 18, comprising a piston casing 19 and a piston 20, having a piston rod 21 extending out through one end of said casing. A compression spring 23 may be provided butting at one end 23ᵃ against one end of the piston casing, and at the other end 23ᵇ against the piston 20 for normally holding said piston in its closed position as shown. Preferably, a slot 24 is provided in the side of casing 19 through which a screw or the like 25 secured in the piston may pass, to prevent relative rotation of the piston within the casing.

An arm 26 is shown pivotally secured as at 27 to the outer end of piston rod 21. The forward end of said arm 26 may be hook shaped as at 26ª, and may be positioned so as to lie in the path of pegs 17 carried by the rotating disk or gear 16. Suitable provision may be made to hold arm 26 resiliently against pegs 17. For this purpose arm 26 may assume the form of a bell crank lever by the provision of an additional arm 26ᵇ having a tension spring 28 attached to its upper end and to screw 25. As disk 16 rotates in the direction indicated by arrow 29, pegs 17 will engage hook 26ª as shown. Continued rotation of said disk will then move arm 26 into the dotted line position 30. Thus piston 20 will be pulled against the compression of spring 23.

While arm 26 is being moved into dotted line position 30, the next peg 17 following will engage the top of said arm and gradually press it out of engagement with the peg ahead. As soon as the hook is thus released, spring 23 will thrust the piston back to the position shown and the arm 26 back to the full line position where the hook is engaged by the next peg as shown and the foregoing steps repeated.

The indicating member of the instrument is shown at 31 in Fig. 2. The mechanism of this member may be that of any of the well known counting devices and is therefore not shown here; it being sufficient to state that the actuation of the device is effected by a partial rotation of lever arm 32 secured on the shaft 33 of the device, (see also Fig. 3). This arm is shown as bifurcated and engages between its projections, a pin 34 fixed in a cylinder or transmitting element 35 in the cylinder casing 36; the pin projecting without the casing as shown in Fig. 2 through a slot not shown, similar to slot 24 shown in the piston casing 19 in Fig. 1. A spring 37 is provided to normally maintain cylinder 35 in the position shown.

When piston 20 (Fig. 1) is pulled forward against spring 23 which takes place slowly, thus placing a very small and substantially uniform load on the fan, air leaks through between the piston and casing into the chamber thus created in the rear end of casing 19. But when the piston is thrust back by said spring more rapidly than the air can escape through the same space, it is forced through tubing or conduit 38 into cylinder casing 36, between the end 36ª thereof and cylinder 35. This thrusts cylinder 35 backward against spring 37, and effects the aforementioned partial rotation of lever arm 32, and actuates the indicating device. It will, therefore, be evident that no air is compressed by the direct action of the wind wheel.

As shown in Fig. 1, I may provide one or more grooves 39 around the bearing surface of piston 20. The groove may incline gradually from said bearing surface to a convenient depth; the shallower side being toward the air compression end of the piston. The groove will thus effect the formation of an oil ring 42 of the lubricating oil between the piston and casing during the compression stroke, and a spreading of said oil during the receding stroke. This will aid in preventing the escape of air around the piston during the air compression stroke, while permitting the leaking in of air during the receding stroke.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I desire to secure by Letters Patent is:

1. An air distance indicator for aircraft, comprising a totalizing device adapted to be located adjacent the aviator, including an air pressure responsive member for actuating said device, means for producing intermittent variations of pressure for actuating said member, and a wind wheel adapted to bring into action said means and adapted to be located on an exposed portion of the craft.

2. An indicating instrument for aircraft comprising a wind driven fan, a cigar-shaped casing rotatably supporting said fan at its forward end and adapted to be secured to an exposed portion of the airplane, reduction gearing within said casing, a fluid pressure varying means actuated thereby, a remotely located indicating device, pressure responsive means for actuating the same, and a connection between said casing and said indicator.

3. An indicating instrument for aircraft comprising a substantially cylindrical casing having rearwardly extending reduced member adapted to be secured to the airplane, a revoluble nose on said casing, blades or vanes secured to said nose, reduction gearing within said casing rotated by said nose, and a transmitting means also within said casing for transmitting to a distance intermittent impulses in proportion to the number of revolutions of said nose.

4. An indicating instrument for aircraft comprising a wind driven fan, a fluid pressure varying device adapted to transmit intermittent impulses, and means substantially uniformly actuated by said fan for bringing into action said pressure varying means.

5. An indicating instrument for aircraft comprising a wind driven fan, a fluid pressure varying device adapted to transmit intermittent impulses, and means brought into action by the rotation of said fan which energizes slowly and releases suddenly said pressure varying means.

6. An indicating instrument for aircraft comprising a wind driven fan, and a fluid pressure varying device controlled thereby and adapted to transmit intermittent impulses, comprising means adapted normally to cause only slight reduction of pressure in said device but to cause periodically sudden larger variations in pressure in proportion to the revolutions of the wind wheel.

7. An indicating instrument for aircraft comprising a substantially cylindrical casing, a forwardly revoluble nose on said casing, blades or vanes secured to said nose, reduction gearing within said casing rotated by said nose, and a transmitting means also within said casing for transmitting to a distance intermittent impulses in proportion to the number of revolutions of said nose.

8. An indicating instrument for aircraft comprising a wind driven fan, reduction gearing connected thereto, a member rotated thereby, means brought into action periodically by the rotation of said member, and adapted to cause periodic, sudden variations in fluid pressure, and an indicator actuated by such variations in fluid pressure.

9. An air distance indicating instrument for aircraft comprising a wind driven fan adapted to be located on an exposed portion of the airplane and actuated by the forward travel of the aircraft, a transmitting means driven by said fan, a totalizing device adapted to be located adjacent the aviator, motive means for actuating said totalizing device, and means interconnecting said transmitting means and motive means for actuating the latter from the former.

In testimony whereof I have affixed my signature.

MORRIS M. TITTERINGTON.